United States Patent [19]
Van Natta

[11] 4,359,105
[45] Nov. 16, 1982

[54] SOIL WORKING IMPLEMENT INCLUDING HYDRAULIC CENTERING AND LOCKING MEANS FOR CASTER WHEEL

[75] Inventor: Terry L. Van Natta, Bettendorf, Iowa
[73] Assignee: Deere & Company, Moline, Ill.
[21] Appl. No.: 247,581
[22] Filed: Mar. 26, 1981
[51] Int. Cl.³ .............................................. A01B 3/24
[52] U.S. Cl. .................................. 172/386; 172/413; 172/422
[58] Field of Search ............... 172/386, 413, 422, 395, 172/278

[56] References Cited

U.S. PATENT DOCUMENTS

| | | | |
|---|---|---|---|
| 2,981,344 | 4/1961 | Roberson | 172/386 |
| 3,700,042 | 10/1972 | Patterson | 172/386 |
| 3,701,385 | 10/1972 | Patterson et al. | 172/386 |
| 3,751,071 | 8/1973 | Patterson et al. | 172/285 X |
| 4,236,584 | 12/1980 | Isachsen | 172/385 |

Primary Examiner—George J. Marlo
Attorney, Agent, or Firm—Henderson & Sturm

[57] ABSTRACT

Hydraulic center and lock structure for the caster wheel of, for example, a tractor-drawn plow, operative on a centering element rigid with the standard of the caster wheel for forcibly centering the standard and ultimately locking the standard against turning about its axis when the caster wheel is in its straight-ahead position. The hydraulic device is bi-directionally operative for disengagement from the centering element to enable free castering of the wheel, as when the plow is raised for transport. The invention also provides two forms hydraulic control for coordinating the raising and lowering of the plow with unlocking and locking the caster wheel. In one form, the system provides for trapping fluid in the caster wheel cylinder in its straight-ahead position, with a separate valve operated manually to release the fluid when the plow is lowered to operating condition. In another form the valve that releases the trapped fluid is made responsive to a predetermined pressure. Both systems prevent unlocking of the caster wheel during relative minor height adjustments of the plow during operation.

9 Claims, 8 Drawing Figures

SOIL WORKING IMPLEMENT INCLUDING HYDRAULIC CENTERING AND LOCKING MEANS FOR CASTER WHEEL

BACKGROUND OF THE INVENTION

A tractor-drawn plow or disc tiller is typical of the many agricultural implements that employ caster wheels. A plow, for example, has a fore-and-aft elongated frame carried at one side by a land wheel, at its other side by a furrow wheel and at its rear by a caster wheel. During the plowing operation, it is necessary to lock the caster wheel in its straight-ahead position so as to enable the plow to follow its course, the wheel serving to resist side thrusts acting on the plow, particularly on hillsides. During transport of the plow, however, with the plow bottoms raised clear of the ground, it is desired that the caster wheel be permitted to caster as the plow trails the tractor so as to avoid scuffing and undue wear on the caster wheel tire.

Many forms of locking devices are known to the art. These are mainly mechanical and are deficient in that insufficient force is available to center the caster wheel immediately in its straight-ahead position. One such device forms the subject matter of the U.S. Patent to Patterson et al., No. 3,700,042 and comprises essentially a spring-loaded means for holding the caster wheel on track but yielding to over-riding side forces. The device is capable of being disengaged to permit free castering during transport. Another example will be found in the U.S. Patent to Isachsen, No. 4,236,584. This device employs mechanical linkage capable of being locked and unlocked according to the desired status of the caster wheel.

The present invention constitutes a significant improvement over the prior art in that it employs hydraulic force to center the caster wheel in its straight-ahead position rather than leaving it to the wheel to find its own position. This is accomplished by providing the caster wheel axle standard with a centering element having torque arms by means of which the hydraulic means can cause turning of the standard to its preselected straight-ahead position, thus avoiding any chance that the wheel may hang up in a non-straight-ahead position. After acting on the centering element to center the wheel, the hydraulic device cooperates with notch means between the torque arms to lock the standard. For free castering, the hydraulic means is operated in the opposite direction to disengage the centering element so that the wheel is free to caster. In the case of a plow having hydraulic means to raise and lower the plow, the hydraulic means of the centering mechanism and that of the raising and lowering means are interconnected so that lowering of the plow locks the caster wheel and vice versa. Another U.S. Patent to Patterson et al., No. 3,701,385, discloses mechanical lock means for a disk tiller in which the caster wheel is locked out of caster status when the tiller is raised. This is achieved by a sector having a notch into which a pin fits and the pin is mechanically linked to the frame to operate according to raising of the frame. This device does not include positive centering means and successful operation depends upon accurate adjustment of the linkage.

DETAILED DESCRIPTION OF A PREFERRED EMBODIMENT OF THE INVENTION

Figure 1:
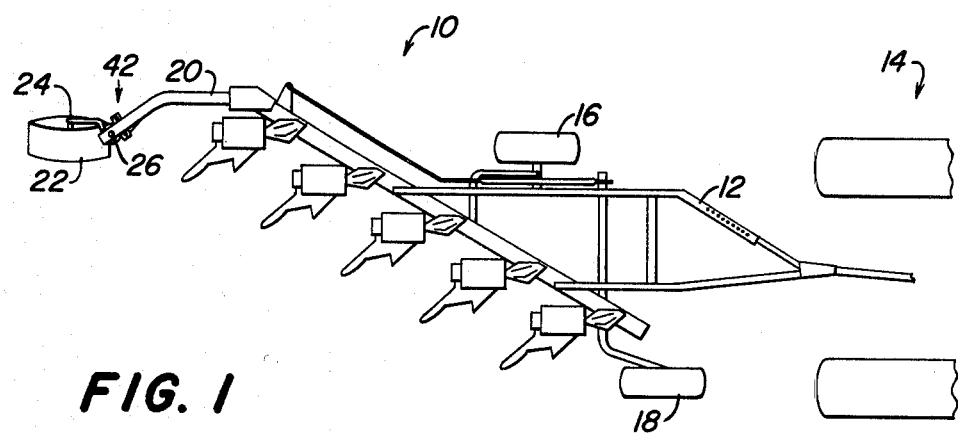
FIG. 1 is a small-scale plan view of a typical agricultural plow to which the present invention is adapted.
Figure 2:
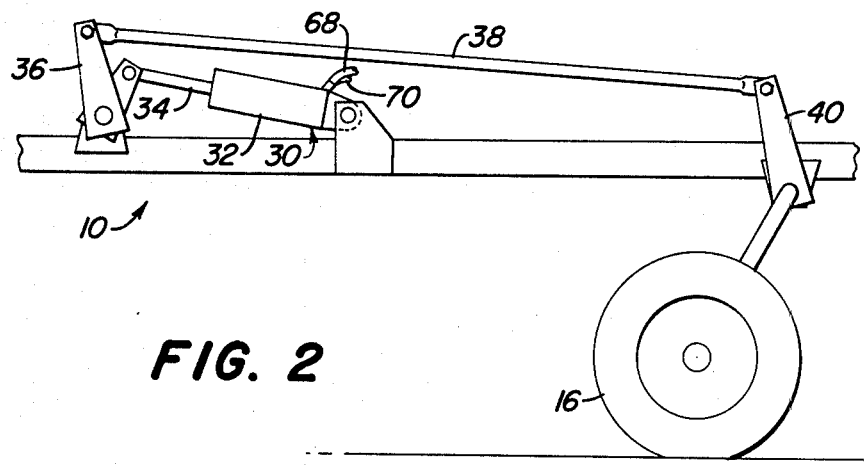
FIG. 2 is a larger, fragmentary view from the land wheel side of the plow and shows part of the means for raising and lowering the plow.

Reference will be had first to FIG. 1, wherein the numeral 10 designates a typical multi-bottom plow having a hitch 12 connected to a tractor 14. The intermediate portion of the plow is supported at its left side by a land wheel 16 and at its right side by a furrow wheel 18, and the rear of the plow includes a generally fore-and-aft frame member 20 supported by a caster means including a caster wheel 22 journalled for rolling rotation on an axle 24 which has an integral, upright standard 26 journalled on an upright axis by a bearing 28 on the frame member 20. As is typical, the axles for the land and furrow wheels are cranked for the purpose of being utilized as part of the means for raising and lowering the plow relative to the ground. FIG. 2 illustrates one form of construction employing a bi-directionally operative hydraulic means 30 such as a two-way cylinder 32 anchored to the plow frame and having a piston rod 34 connected to a swingable arm 36 which is in turn connected by a lift rod 38 to an arm 40 rigidly attached to the cranked axle for the land wheel 16. Extension of the piston rod rocks the arm 36 forwardly and this acts through the lift rod 38 and arm 40 to rock the cranked axle for the land wheel also forward, causing the plow frame to raise. Suitable force-transmitting connections are made to the furrow wheel axle and caster wheel frame but, since these are or may be conventional, need not be described in detail.

Figure 3:
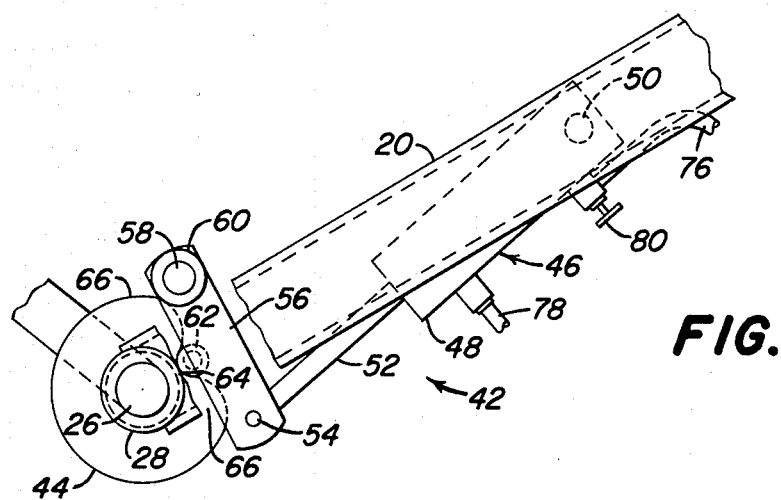
FIG. 3 is an enlarged plan, with parts broken away and showing the centering means locking the caster wheel in its straight-ahead position.
Figure 4:
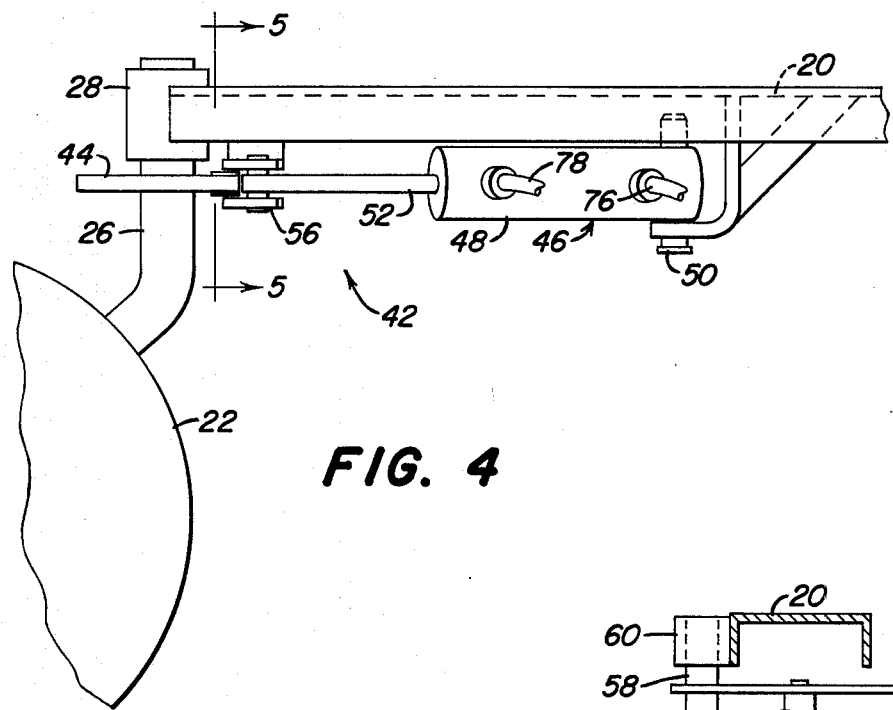
FIG. 4 is a partial side view of the structure shown in FIG. 3.
Figure 5:
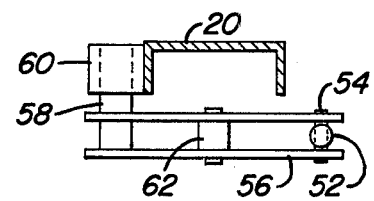
FIG. 5 is a section as seen substantially along the line 5—5 of FIG. 4.
Figure 6:
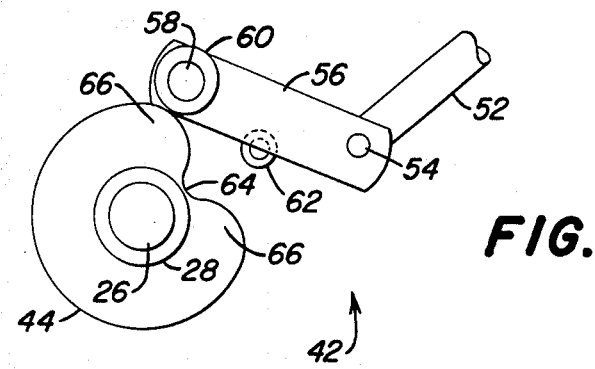
FIG. 6 is a plan similar to FIG. 3 but with further parts omitted and showing the centering means released.

The control or centering means for the caster wheel is indicated generally at 42 (FIGS. 3, 4 and 6) and includes means functioning as locking means for releasably retaining the caster wheel in its straight-ahead position during the plowing operation. In the present context, "straight ahead" means that, as employed in the art, a lead-in of about 5° is preset into the mechanism to counteract forces from the plow bottoms. Thus, the term "straight-ahead", in the description and in the appended claims, should be understood in that sense as well as in other variations of "straight ahead" as dictated by the equipment in which the invention is utilized. Part of this means comprises a centering element 44 and another part comprises a bi-directional power-operated device or hydraulic means 46, here in the form of a two-way hydraulic cylinder 48 pivotally connected to the frame member 20 at 50 and having its piston rod 52 connected at 54 to one end of a lever arm 56 which is pivoted on a vertical pin 58 carried in a bearing 60 affixed to the frame member 20. The lever carries intermediate its ends a cam follower or roller 62.

The centering element 44 is shown here as a cam rigid with the standard 26 and generally radial to the castering axis provided by the bearing 28. The cam has a dwell or notch 64 disposed according to the straight-ahead position of the caster wheel. In the present case, the notch or recess is centered on the lengthwise axis of the frame member 20 but could be otherwise disposed. Flanking the notch are a pair of preferably symmetrically arranged and shaped cam lobes 66, and the remainder of the cam may be circular about the axis of the standard. As will be seen from FIG. 3, when the hydraulic means 46 is extended, the piston acts via the lever arm 56 to cause the lever arm roller 62 to fit into the cam recess, thus locking the standard in the straight-ahead position of the caster wheel. Conversely, when the piston rod is retracted, the lever arm is swung the other way and the roller is withdrawn from the cam recess. As will appear presently, the cam lobes act as arms capable of exerting a torque on the standard should the cam notch be to either side of the straight-ahead position of the caster wheel and thus the standard can be forcibly turned until the roller enters exactly into the cam recess. Although the cam lobes have been disclosed as being symmetrical at each side of the notch, it should be understood that deviations from symmetry may be exploited, as where the geometry of the construction does not result in equal torque in both directions. Moreover, accommodations can be made for adjustability to compensate for deviations from precise straight-ahead positions, as by adjustment of the cam angularly about its axis, adjustability of the roller arm and the like. These are all within the range of those skilled in the art on the basis of the present disclosure.

Figure 7:
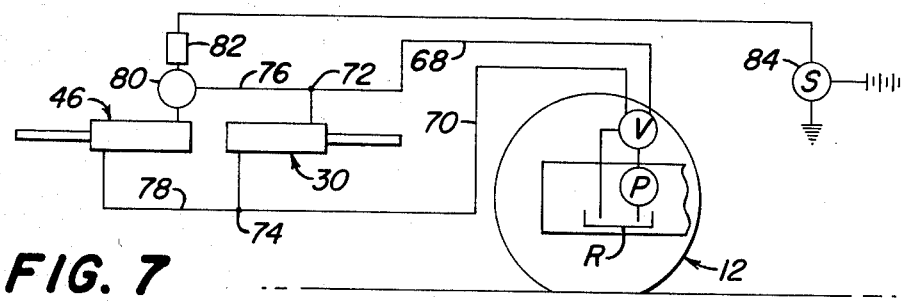
FIG. 7 is a schematic view of the hydraulic and electrical circuits involved in the control of the raising and lowering means and the centering means.

FIG. 7 illustrates schematically a preferred system of controlling the centering means hydraulic motor 46 and includes a parallel connection with the lift and lower motor 30. The tractor, as is conventional, includes a main hydraulic system including a pump P, reservoir R and main control valve V for controlling fluid pressure to opposite ends of the lift and lower motor via fluid lines 68 and 70, all of which is or may be conventional. According to the present invention, however, the two motors are connected in parallel via appropriate tees 72 and 74 and extension fluid lines 76 and 78 to opposite ends of the centering means motor 46 in such manner that, when the lift-lower motor 30 is pressurized to lower the plow, the piston of the motor 46 is extended in its straight-ahead position. As a further feature of the invention, in one form thereof, the motor 46 is provided at its connection with the line 76 with a valve means 80, closable to trap fluid in the motor 46 while the piston 52 is extended, thus positively maintaining the lock on the centering and locking means. The valve may be manually operated at the motor 46 (FIG. 3) or may be remotely controlled by a solenoid 82, for example, at the valve and suitable wiring to a switch 84 at the tractor (FIG. 7).

Figure 8:
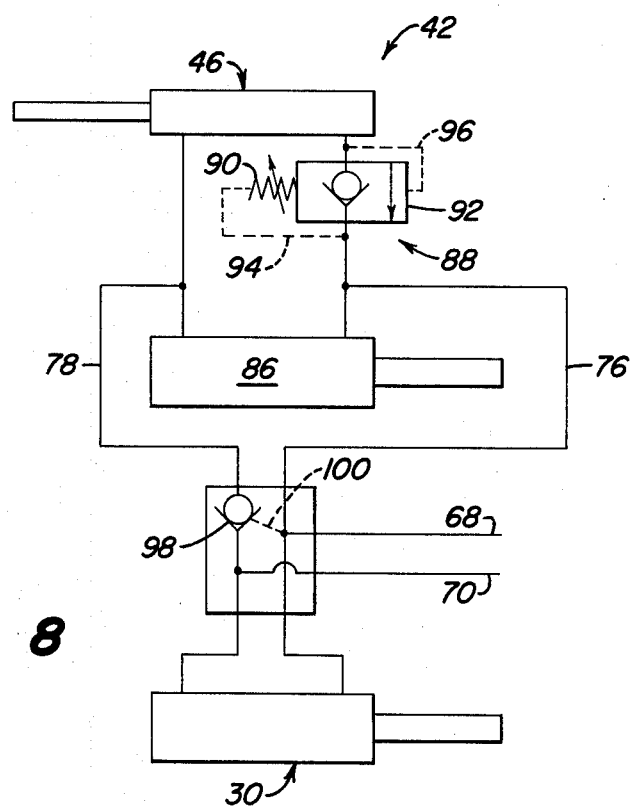
FIG. 8 is a diagrammatic view of a modified form of hydraulic circuit between the lift motor and the caster wheel locking motor.

FIG. 8 illustrates diagrammatically another form of hydraulic circuit means between the two motors 30 and 46 and, in addition, shows a second lift motor 86, usable for raising and lowering the rear end of the plow. That is to say, in the event that a relatively long plow or tiller is involved; although the problem exists in shorter equipment also. The purpose of this circuit means is to avoid unlocking the caster wheel when the plow is raised in rather small increments; for example, when slight raising is required to decrease draft on the hitch or to avoid wheel slippage to tough field conditions. Basically, the caster wheel motor cannot be operated to disengage the centering element until the plow has attained a pre-selected raised position or lift pressure, as when turning at the end of the field, leaving the field, etc.

The fluid lines 68, 70, 76 and 78, referred to in FIG. 7 will be recognized in FIG. 8. The lines 68 and 70 (labelled "lower" and "raise", respectively, for convenience) lead to a distributor box of any suitable type whence they proceed to the three motors. In place of the manually or remotely controlled valve 80 is an adjustable pressure relief valve means 88 having an adjustable biasing means 90 that biases a valve member 92 to the position shown. A pilot line 94 leads from the line 76 to conduct fluid pressure in the direction of the biasing means, and a second pilot line 96 leads from the closed end of the motor 46 to act on the valve member in opposition to the biasing means. As shown in FIG. 8, a check valve within the valve member allows flow to the closed end of the motor 46 at all times, but the check valve prevents flow from the closed end of the motor while the valve member is in its closed position as shown.

When the tractor control valve is moved to cause lowering of the plow via line 68, fluid pressure acts on the rod ends of the lift motors 30 and 86 as well as on the closed end of the caster wheel lock motor 46, thus retracting the lift motors and extending the caster wheel lock motor to center and lock the caster wheel in its straight-ahead position. However, when the control valve is operated to raise the plow in an increment to overcome field conditions as noted above, the pressure in the system is insufficient to act via the pilot line 96 to overcome the bias on the valve member 92 and hence the check valve in the valve member prevents release of fluid pressure from the closed end of the motor 46 and, consequently, the motor cannot retract and thus the caster wheel remains in its locked, centered position. The setting of the biasing means 90 is selected to achieve this result, but the biasing means will be overcome, and the valve member will move to its open position, to the left of its FIG. 8 position, via the pilot line 96, when the preset pressure is reached, as when the lift motor pistons bottom out upon attainment by the plow of full raised position or some other pre-selected position preventing further raising of the plow. Thus, the valve member opens to enable release of fluid pressure from the closed end of the motor 46 and this motor can now retract and release the caster wheel for free turning or castering. During lowering of the plow, a distributor valve 98 becomes effective. This valve is a pilot-operated check valve via a line 100 and has a built-in 4:1 ratio so as to assure that the front of the plow (by means of the cylinder 30) lowers first. The check valve 98 requires high pressure in lines 68 and 100 before it will open. This is achieved by high pressure by completion of the stroke of the cylinder 30.

During transport of the plow, the plow bottoms will of course be raised via the motors 30 and 86 and, because of the parallel fluid line connection, the motor 46 will be retracted and the centering means will be unlocked so that the caster wheel is free to caster. Conversely, when the plow is lowered for field operation, the motors 30 and 86 are retracted and the motor 46 is extended. Should the caster wheel be out of its straight-ahead position within limits (in the instant case 55°–60°;

although this could be varied), the roller 62, via force on the lever arm 56 by the extending motor 46, will engage one or the other of the torque arms provided by the cam lobes 66 and will thereby center the wheel and standard quickly and positively. Should the wheel be out of its straight-ahead position in an angular amount beyond the range of the cam lobes, it will ultimately attain a position within reach of one or the other of the lobes upon forward motion of the plow. At this point it should be noted that the remainder of the cam portion other than in the area of the notch or recess and cam lobes is circular about the axis of the standard so that the roller can ride this circular portion until the cam reaches an angular position enabling the roller to ride down one of the lobes and into the recess. The cam shape could be varied, however, to provide for torque action throughout except at exactly 180°.

Among the features of the invention are its simplicity, its ready adaptation to existing machines and its ability to apply torque to the centering means to quickly attain straight-ahead position of the caster wheel. Features and advantages other than those enumerated will readily occur to those skilled in the art, all of which may be achieved without departure from the spirit and scope of the invention.

I claim:

1. An agricultural soil-working implement having a fore-and-aft frame member spaced above the ground and including a bearing on a substantially upright axis, caster means supporting the frame and including a ground-engaging wheel and an axle journalling the wheel for rolling rotation and having a standard journalled in the bearing for turning about said axis, and locking means for releasably locking the standard with the wheel in straight-ahead position, characterized in that the locking means includes a centering element rigid with the standard and having therein notch means disposed according to the straight-ahead position of the wheel and further having a pair of arm portions diverging from the notch means and arranged to apply torque to the standard about its axis in response to forces acting thereon when the wheel is out of its straight-ahead position, and a bi-directional power-operated device acting between the frame and the centering element and including a movable part operative in one direction of operation of the device to enter between the arm portions and to engage one or the other of the arm portions, depending upon the direction to which the wheel is out of its straight-ahead position, and ultimately to enter the notch means for centering the standard and locking it in the straight-ahead position of the wheel, said part being movable in the other direction of operation of the device to disengage from the centering element to enable free turning of the standard about the axis.

2. An implement as defined in claim 1, further characterized in that the centering element is a cam rigid with the standard, the notch means is a dwell in the cam and the arm portions are lobe portions disposed at opposite sides of and leading to the dwell.

3. An implement as defined in claim 2, further characterized in that a lever is movably mounted on the frame for movement toward and away from the cam and includes a cam follower for engaging the lobes and entering the dwell, and the movable part of the power-operated device is operatively connected to the lever.

4. An implement as defined in claim 1, further characterized in that the power-operated device is fluid-pressure-operated, and valve means is provided for trapping fluid in the device when the movable part centers and locks into the notch means in the centering element.

5. An agricultural soil-working implement adapted to be drawn by a tractor provided with a hydraulic pressure source and having a generally horizontal, fore-and-aft frame member spaced above the ground and including a bearing on an upright axis, ground-engaging means supporting the frame, first, bi-directional hydraulic means connected to the tractor hydraulic source and operative between the frame and the ground-engaging means for selectively raising and lowering the frame, caster means additional to the ground-engaging means and including a wheel, an axle for journalling the wheel for rolling rotation, said axle including a standard journalled in the bearing for turning about said axis, and locking means for releasably locking the standard against turning with the wheel in its straight-ahead position, characterized in that the locking means includes a centering element rigid with the standard and having therein notch means disposed according to the straight-ahead position of the wheel and further having a pair of arm portions diverging from the notch means and arranged to apply torque to the standard when the wheel is out of its straight-ahead position, second, bi-directionally operative hydraulic means acting between the frame and the centering element and including a movable part operative in a first direction of operation of said second hydraulic means to enter between the arm portions and to engage one or the other of the arm portions, depending upon the direction toward which the wheel is out of its straight-ahead position, and ultimately to enter the notch means for centering the standard and locking it in the straight-ahead position of the wheel, said part being movable in the second direction of operation of the second hydraulic means to disengage from the centering element to enable free turning of the standard about its axis, and a pair of fluid line means connecting the two hydraulic means in parallel so that operation of the first means to lower the frame causes operation of the second means to center and lock the standard and vice versa.

6. An implement as defined in claim 5, further characterized in that valve means is provided in one of the fluid lines for selective closing to trap fluid in the second hydraulic means when the standard is turned to the straight-ahead position of the wheel.

7. An implement as defined in claim 6, further characterized in that control means is provided in remote relation to the valve means for selective opening and closing thereof.

8. An agricultural implement as defined in claim 5, further characterized in that valve means is provided in one fluid line intermediate the two hydraulic means and automatically closable to trap fluid in the second hydraulic means to prevent operation of said second hydraulic means after the centering element has been engaged and locked, and pressure operated means is provided for opening said valve means to release trapped fluid in response to raising of the frame member by the first hydraulic means to a pre-selected position.

9. An agricultural implement as defined in claim 8, further characterized in that the valve means includes a member movable between fluid-trapping and fluid release positions, means biasing said member to the fluid-trapping position, and pilot line means acting on said member and against the biasing means to move said member to its fluid-release position upon attainment by the frame member of the aforesaid pre-selected position or lift pressure.

* * * * *